March 19, 1957 F. TERRANOVA 2,785,434
MEAT BONING MACHINE
Filed Sept. 8, 1955 7 Sheets-Sheet 1

INVENTOR.
Federico Terranova
BY
Frank E. Liverance, Jr.
Attorney

INVENTOR.
Federico Terranova
BY
Frank E. Liverance, Jr
Attorney

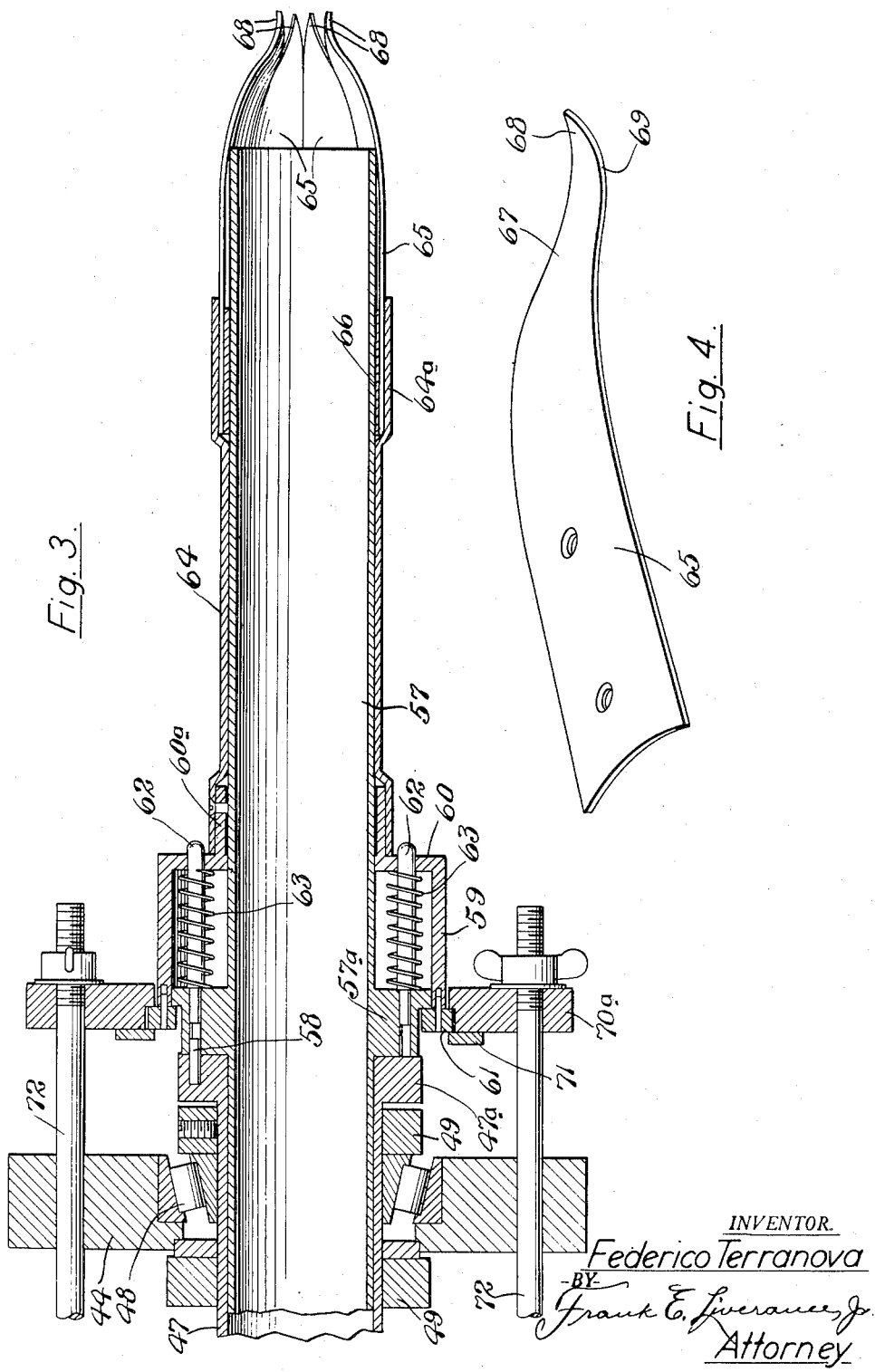

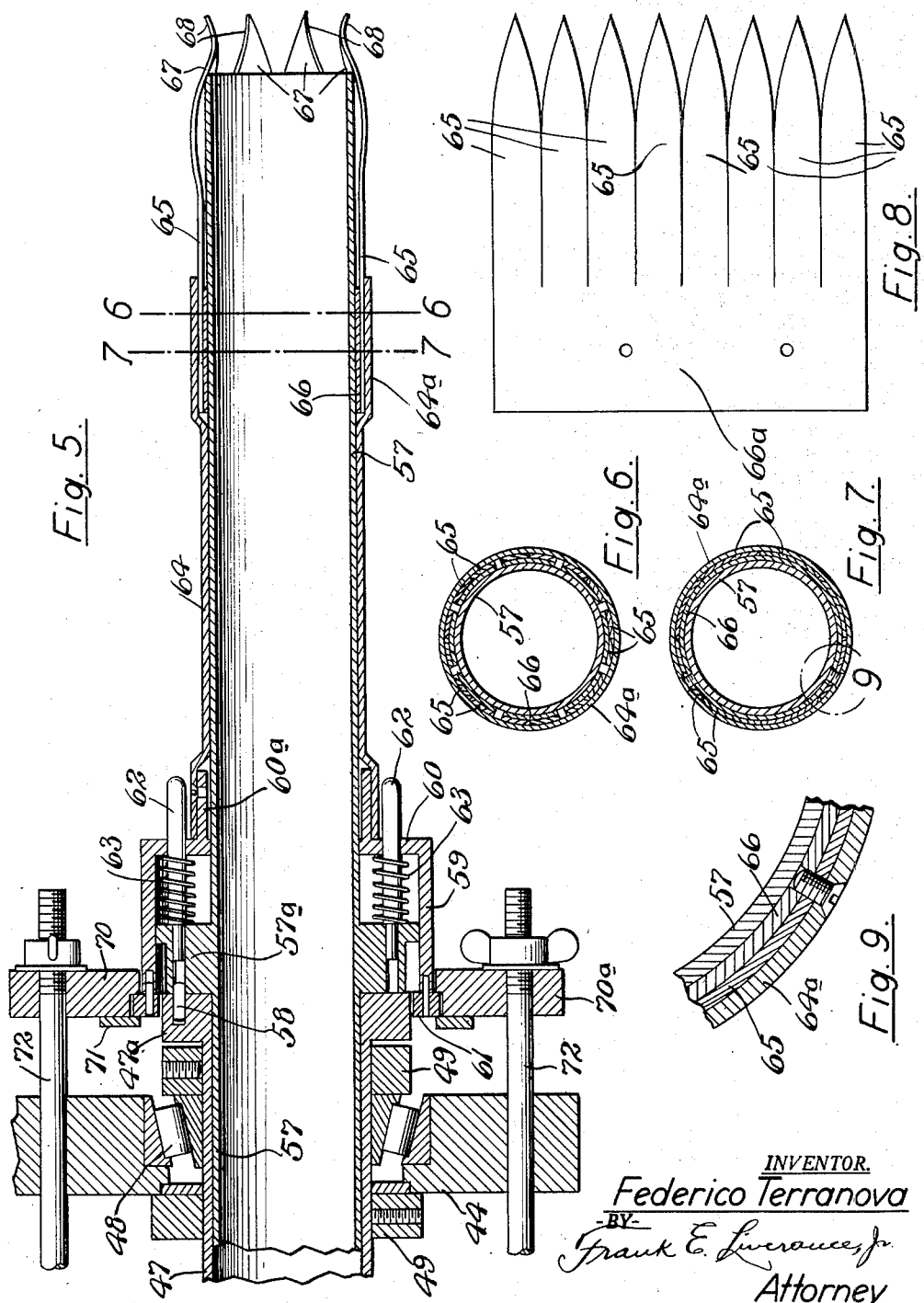

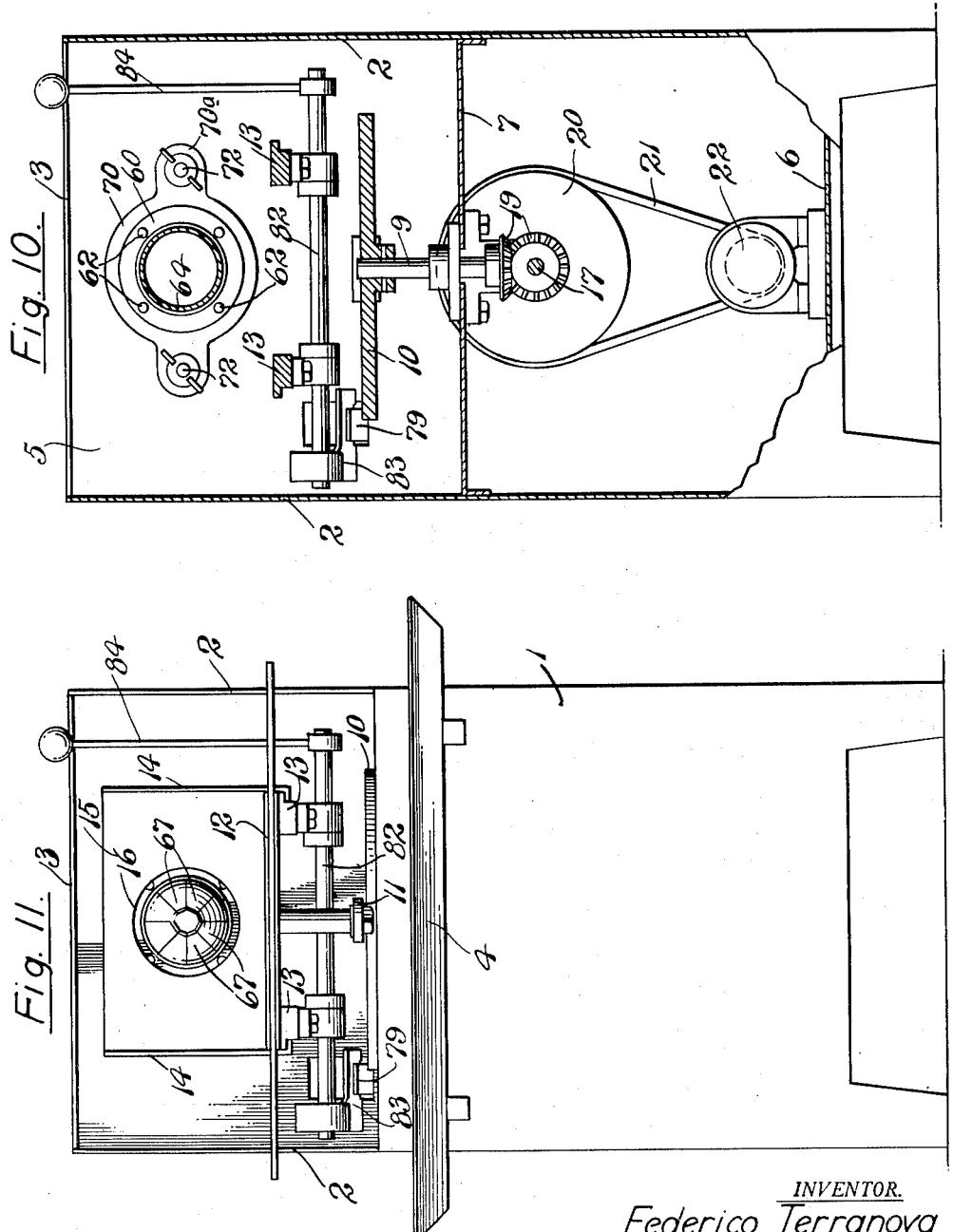

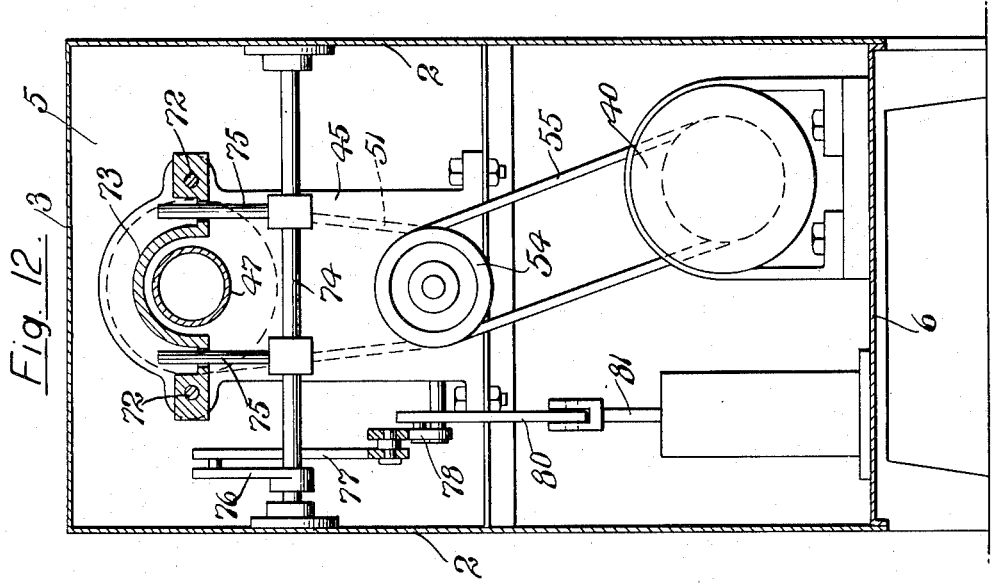
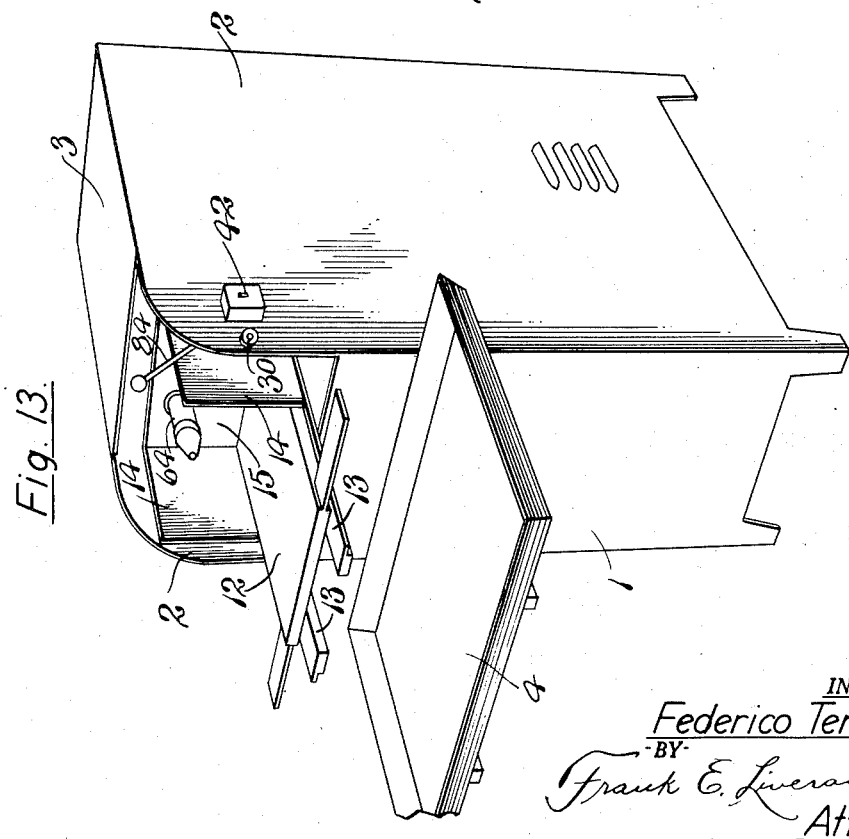

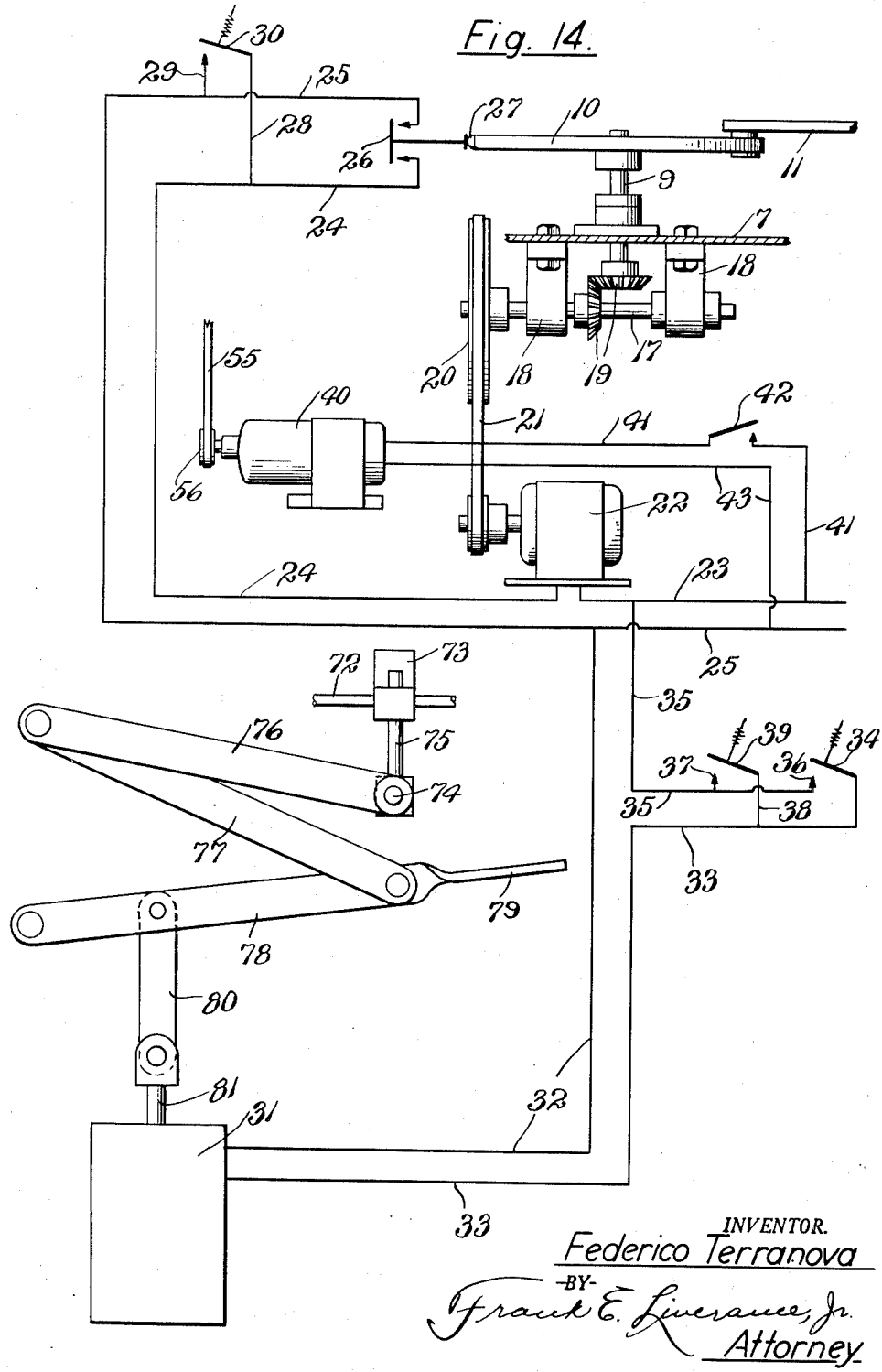

United States Patent Office 2,785,434
Patented Mar. 19, 1957

2,785,434

MEAT BONING MACHINE

Federico Terranova, Grand Rapids, Mich., assignor to Chick-nova Corporation, Grand Rapids, Mich., a corporation of Michigan Application September 8, 1955, Serial No. 533,209

10 Claims. (Cl. 17—1)

This invention relates to the deboning of meats, particularly hams or the like, in which the bones extend generally centrally and lengthwise thereof.

It is an object and purpose of the present invention to provide novel feeding power actuating apparatus or improvements in the machine which will force the ham or other similar meat products to the deboning apparatus, moving it in one direction the required length so that the bone is separated from the meat and returning it to initial or starting position after such bone separation has taken place.

A further object of the invention is to provide a more efficient, practical and effective immediate deboning cutting apparatus which will insure better severing of the meat from the bone without such meat cutting apparatus gouging into the bone, together with an automatic partial opening of the meat cutting knives to pass over the enlarged end of the bone at one end of the ham or other like meat product, and also automatically partially open such cutting knives to pass over a joint between the ends of the thigh and leg bones which joint is of greater cross sectional area than any of the bones, safeguarding against the cutting knives cutting into the bones and perhaps being damaged thereby, such bone knife cutting being avoided.

Many other objects and purposes than those enumerated, with practical novel and useful control apparatus for effecting the same, will be apparent and may be understood from a preferred embodiment of my invention, described in the following description and shown in the accompanying drawings, in which, Fig. 1 is a horizontal longitudinal section and plan, the section being substantially on the plane of line 1—1 of Fig. 2 looking downwardly.

Fig. 3 is a fragmentary horizontal, somewhat enlarged, horizontal section on the plane of line 3—3 of Fig. 2, such plane being coincident with the plane of line 1—1 but of shorter length.

Fig. 4 is a perspective view of one of the meat cutting knives, a plurality of which are used.

Fig. 5 is a vertical section on the same plane as Fig. 3, showing like structure with the parts illustrated in a different position.

Figs. 6 and 7 are transverse vertical sections substantially on the planes of lines 6—6 and 7—7, respectively, of Fig. 5.

Fig. 8 is a plan view of a development of the meat cutting knives all integrally connected together and made from a single rectangular sheet of flat metal.

Fig. 9 is a further enlarged fragmentary portion of the transverse section shown in Fig. 7, the fragmentary portion thereof of Fig. 7 being indicated at the dash and dot circle 9 of such Fig. 7.

Figure 2:
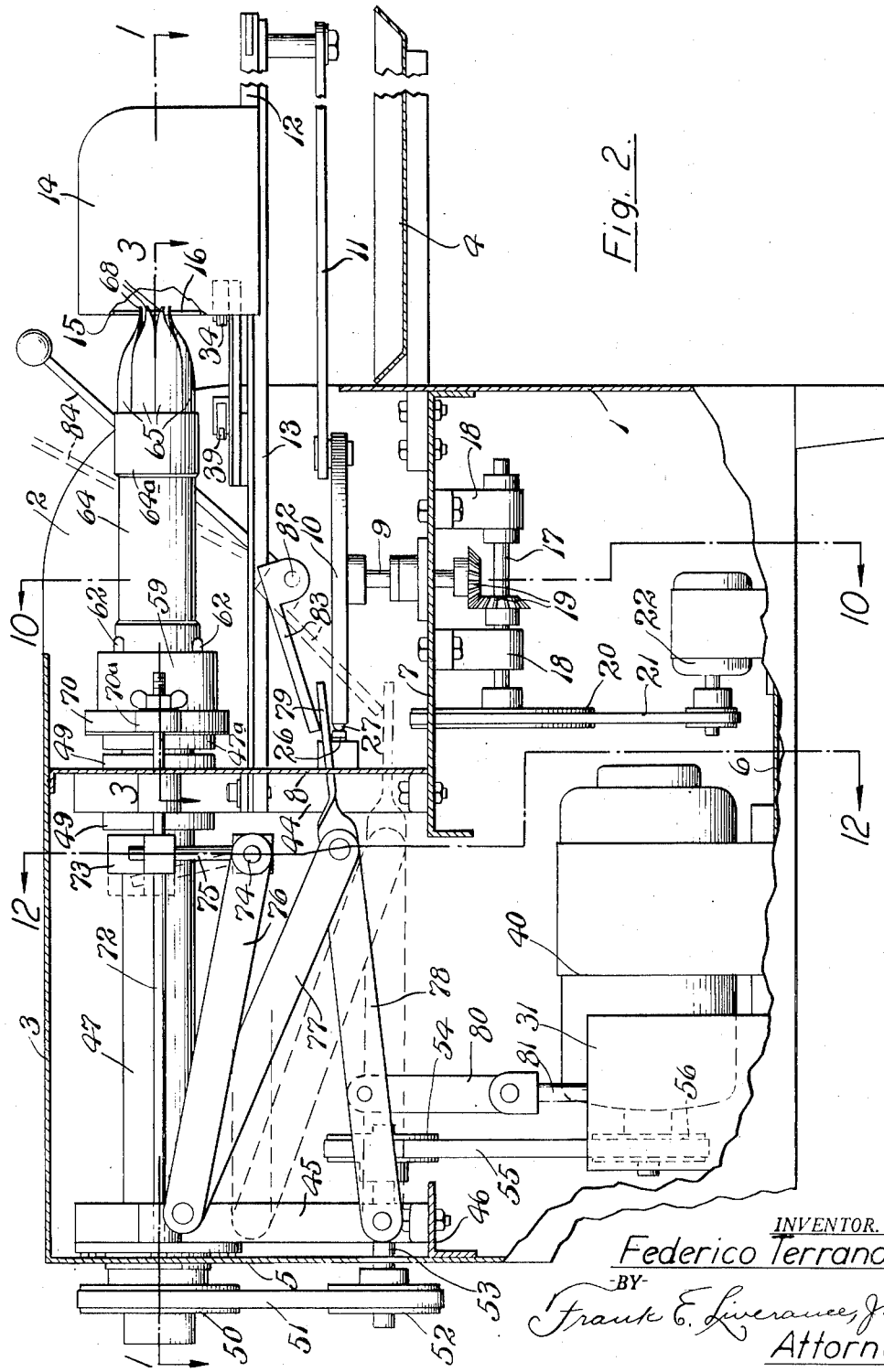
Fig. 2 is a longitudinal vertical section substantially on the plane of line 2—2 of Fig. 1 looking in the direction indicated and showing the interior mechanism in elevation.

Fig. 10 is a transverse vertical section through the machine, substantially on the plane of line 10—10 of Fig. 2, looking to the rear.

Fig. 11 is a front elevation of the machine made in accordance with my invention.

Fig. 12 is a transverse vertical section taken substantially on the plane of line 12—12 of Fig. 2 looking rearwardly.

Fig. 13 is a perspective view of the deboning machine of my invention, the view being taken from the front and to one side thereof, and Fig. 14 is a wiring diagram of the electric circuits and switch controls for the mechanism in the starting and stopping thereof, and other controls for effectively getting the bone separation from the meat.

Like reference characters refer to like parts in the different figures of the drawings.

In the illustrated mechanism which in one form embodies my invention, an enclosing housing or casing is provided having a vertical front 1, spaced parallel vertical sides 2 extending rearwardly from the side edges of the front 1 and above the upper edge of said front, a horizontal top 3, the front edge of which is back of the plane of the front 1 and is between the upper edges of the sides 2, a horizontal drip pan 4 carried on suitable supports and extending in front of the casing located a short distance below the upper edge of the front 1, a vertical back 5 and a bottom 6, all preferably of flat metal welded or otherwise permanently secured together.

A horizontal partition 7 is located between the front portion of the sides 2, connected thereto, and at its front edge to front 1, extending horizontally a distance to the rear approximately one-half of the length of the machine housing. Adjacent its rear edge portions a transverse vertical partition 8 is secured, extending to the under side of the top 3 to which it has permanent connection.

A short vertical shaft 9 extends through the horizontal partition 7. At its upper end a horizontal disk 10 is permanently secured. A bar 11 at its rear end is pivotally connected to the disk 10 near its outer edge, extends forwardly over the drip pan 4 and has a pivotal connection at its front end to a shelf 12 movably mounted for inward and outward reciprocation on spaced horizontal bars 13 secured in fixed relation to the casing or housing of the machine and extending in front thereof.

The horizontal shelf 12 provides the bottom of a ham receiving carriage. The carriage is completed by two vertical sides 14 one at each longitudinal edge of the shelf 12, and at the front portions thereof, between which sides a front vertical plate 15 extends which has a centrally disposed opening 16 therein. The shelf and attached sides and front of the carriage, when moved from outer to inner positions, is to carry a ham or like meat product to the rear, the immediate ham boning knives and the support therefor passing through such opening 16.

Below the lower end of the shaft 9 a horizontal shaft 17 is mounted on spaced journals 18 suspended from the shelf 7. Meshing beveled gears 19 are on shaft 17 and the lower end of shaft 9. At one end of the shaft 9 a pulley 20 is secured, driven by a belt 21 which in turn passes around a drive pulley on the shaft of an electric motor 22. It is apparent that when motor 22 is running the vertical shaft 9 is driven, disk 10 rotated, and the ham carrying carriage is moved back and forth inwardly and outwardly on its guiding and supporting bars 13.

In Fig. 14 the circuit wires and the switches interposed therein are shown not only for the control of motor 22, but of other electric prime movers. One wire 23 leads from an outside source of electrical current to a side of the motor 22. From the other side of the motor a wire 24 extends to a switch 26 interposed between it and the other main circuit wire 25. Wires 24 and 25 at adjacent ends have spaced contacts which may be bridged to complete the circuit by said switch 26. On the disk 10 at one point in its periphery a projection 27 is fixed which when it comes to the switch 26, moves it away from the switch contacts described to break such circuit thereupon motor 22 will stop. After the motor is started it will be thus stopped upon the completion of a single revolution of disk 10. Thus a ham carried by the table 12 of the carriage on which it is carried will be moved inwardly to its innermost position, and then outwardly to its initial starting position, whereupon the rotation of disk 10 is stopped.

Branch wires 28 and 29 extend one from the main wire 24 and the other from the wire 25. One of such wires, as the wire 29, may terminate in a contact with which a normally open spring actuated switch 30 connected with the wire 28 may engage to complete a circuit for driving motor 22 when switch 26 is held in open position by projection 27. Such switch 30 located at a side 2 of the casing and near the front thereof (Fig. 13) is momentarily closed but will immediately open upon being released by the spring shown connected thereto. During momentary closure and completion of the circuit motor 22 will have started its rotation and operated sufficiently to carry the projection 27 away from switch 26 which thereupon instantly closes; and though the circuit may be broken at the switch 30 it will have been completed by switch 26 and stay closed during the single revolution of the disk 10 until projection 27 comes to the switch 26 and moves it to circuit opening position.

In the lower part of the housing a solenoid 31 is positioned which at times is energized for the purpose of accomplishing functions which will be later described. Wires 32 and 33 extend from the opposite ends of the solenoid windings to and are connected with the main circuit wires 22 and 23, respectively. That is, the wire 33 has a continuation thereof which leads to wire 23. A normally open switch 34 is at the end of the wire 33 for movement into closing contact engagement with a contact 36 at the adjacent free end of wire 35.

In addition a branch wire 38 is connected with the wire 33 having a movable normally open spring actuating switch 39 connected therewith which is movable to come in to circuit closing contact with a second contact 37 on the wire 35 and spaced from the contact 36. The switches 34 and 39 are of the type which are normally held open by springs, but on closure engage the contacts 36 and 37 momentarily closing circuits, then continue past such contacts whereby, immediately following such closure of circuits, the circuits are again opened through disengagement of switches 34 and 39 from their respective contacts 36 and 37.

Figure 1:
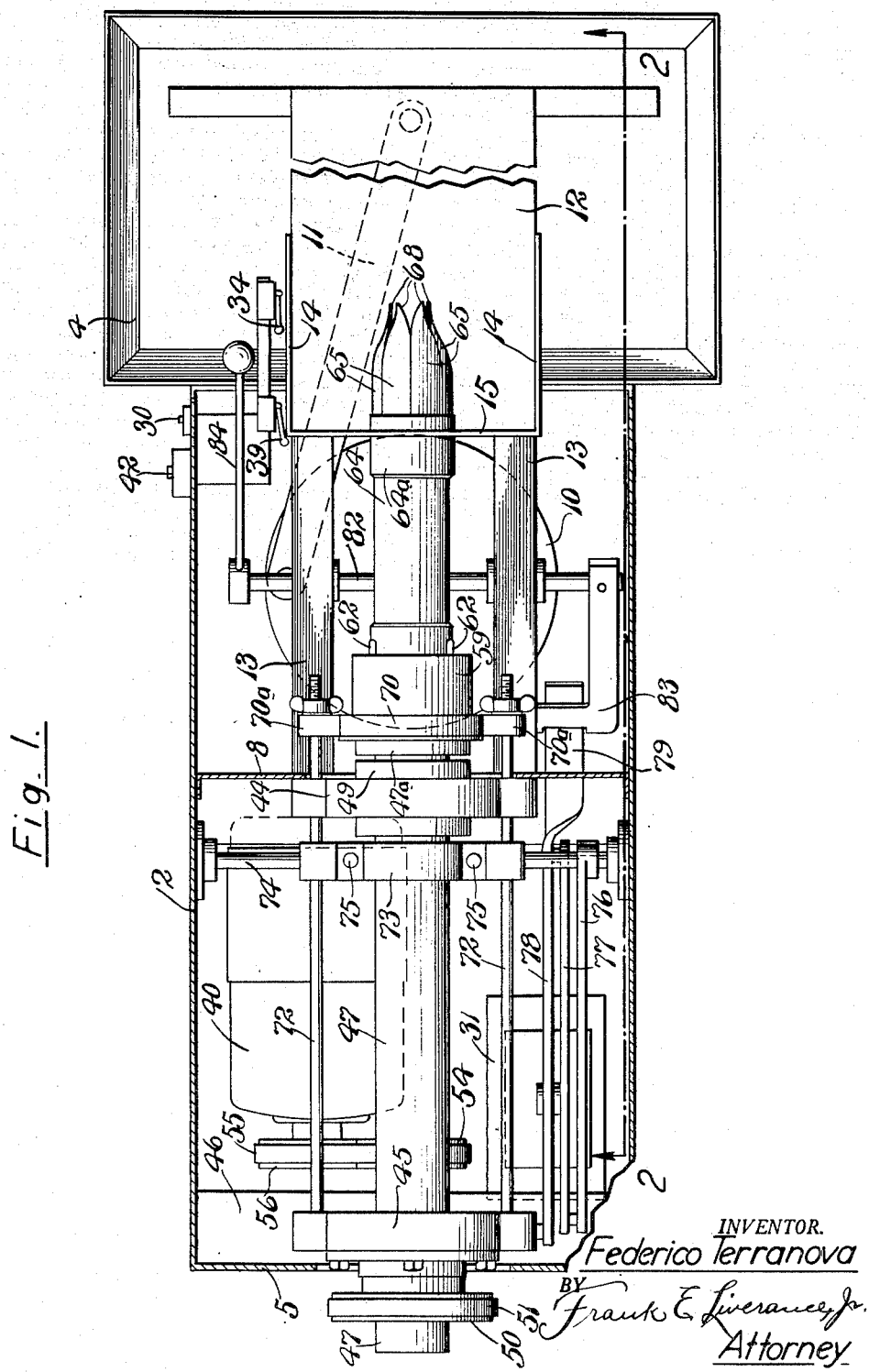

The switches 34 and 39 are carried at one side 14 of the carriage in which the ham to be deboned is placed (Fig. 2). In the outermost position of the carriage, as in Fig. 2, both switches 34 and 39 are open. Immediately upon the carriage starting its inward movement, the first switch, 34, reached by the carriage will be swung outwardly with a momentary closing of the electric circuit through the solenoid 31 which however will be broken as soon as the housing has moved sufficiently to carry the switch beyond the contact with which it engages. For example, in Fig. 1 the first switch has been closed and is again open with the switch held so that closure of the switch 34 is interrupted by a riding of such switch 34 on the outer side of the adjacent side 14. In Fig. 1 the second switch, 39, is open but is about to be momentarily closed as it is pushed outward by the inward movement of the ham carrying carriage. It will be closed only momentarily and then opened as such second switch 39 is forced to the same position as the first switch 34 in Fig. 1. Accordingly, in the operation the solenoid 31 will be twice momentarily energized and will actuate mechanism which it is designed to operate during the very short time closure of either switch 34 and 39. As hereafter described, such mechanism actuated by the solenoid 31 momentarily opens the cutting knives to receive the enlarged outer end of the bone at the start of the meat cutting, and later again momentarily opens the knives so that it will pass over the enlarged knuckle within the ham or similar meat product.

An electric motor 40 has one circuit wire 41 from one side, having interposed therein a manually operable switch 42, connected to the main circuit wire 24, and the other wire 43 leading from the motor to the other circuit wire 25. When switch 42 which preferably is located adjacent the switch 30 (Fig. 13) on a side 2 of the housing is closed, motor 40 runs continuously.

Vertical supports 44 and 45 are located within the housing, the first against the inner side of the vertical partition 8 and the second adjacent the rear side 5 and carried by a transverse angle bar 46 (Fig. 2). An elongated tubular shaft 47 passes through the upper ends of said vertical supports 44 and 45 being mounted for rotation on anti-friction bearings 48 (Figs. 3 and 5), collars 49 secured to the tubular shaft 47 being at opposed sides of the supports 44 and 45 as shown in Figs. 3 or 5. The tubular shaft 47 extends to the rear beyond the rear side 5 of the housing and has a driven pulley 50 thereon, driven by a belt 51 from a pulley 52 on a jack shaft 53 suitably mounted on and extending through the rear support 45 at its inner end having a pulley 54 driven by an endless belt 55 which goes around a drive pulley 56 on the shaft of the motor 40. Thus when the switch 42 is closed the shaft 47 is continuously rotated.

The tubular shaft 47 at its outer end is provided with a relatively heavy annular flange 47a. A tube 57 is telescopically received in the outer end portion of the shaft 47 and has between its ends an outwardly extending annular rib 57a adjacent or coming against the outer side of the flange 47a, connected therewith by pins 58, thus tube 57 rotates with the shaft 47 and at the same speed. A cylindrical housing 59 surrounds the tube 57 being spaced therefrom and has an outer end 60. The housing 59 at its rear end extends over the rib 57a and is held in place by rings 61 and 61a pinned to the housing 59 and bearing against an outwardly extending portion of said rib 57a as shown in Figs. 3 and 5. A plurality of pins 62 are carried by the rib 57a, extending through the housing and at their outer ends through the side 60 thereof, coiled compression springs 63 around the pins normally pushing the housing and parts attached thereto in an outward direction.

A tubular sleeve 64 surrounds the tube 57 and at its rear end is enlarged in diameter to telescope over a forward cylindrical extension 60a integral with the side 60 of the housing described, being secured thereto by screws or other suitable permanent connections, whereby the sleeve 64 rotates in unison with the sleeve 57. The outer end of the sleeve 64 is enlarged in diameter, making an annular skirt 64a. A plurality of cutting knives 65 of thin flexible spring material have the shanks thereof inserted into the skirt 64a and are permanently connected to a sleeve 66 which surrounds the sleeve 57. The sleeve 66 and the shanks of the cutting knives 65 are connected together by pins or like fastenings (Fig. 6) while the skirt 64a of the tubular sleeve 64 is screw connected to the shanks of knives 65 and the inner sleeve 66 (Figs. 7 and 9).

As an alternate structure the knives 65 may be slit and formed as shown in Fig. 8 from a rectangular sheet of thin steel, beginning at one edge of the sheet and extending partly therethrough leaving a solid section 66a (Fig. 8). Such knives and the solid end sections 66a formed into a cylindrical shape may be substituted for the individual knives shown in Figs. 3 and 4 with an elimination of the separate sleeve 66.

The outer end of each knife normally is shaped to bend inwardly, as at 67, terminating at its outer end in an outwardly curved pointed lip 68. The edge portions of such outer end sections 67 of the knives, at 69, are the cutting edges of the knives. Such edges may be sharpened as much as may be needed, though care should be taken not to make such edges so sharp that they will tend to gouge into the bone which is being separated from the meat.

The outer sleeve 64, rotatable with the inner elongated sleeve 57, is also slidable lengthwise thereof between positions shown in Figs. 3 and 5. The springs 63 act to move the sleeves 64 outwardly so that the free ends of the knives 65, in the position shown in Fig. 3, come close to each other. In the second postion, in Fig. 5, springs 63 are compressed, the housing 59 being moved bodily inward and carrying sleeve 64 with it, thus the free end portions 67 of the knives are forced outwardly by riding upon the end of the inner tubular sleeve 57, the knives being separated at their free end portions. Such knives return through inherent spring forces to their normal position (Fig. 3) when sleeve 64 is again moved outwardly.

A ring member 70 surrounds the inner end of the housing 59 and ring 61, and is operatively secured therewith by flat ring 71. Such connection does not interfere with the rotation of the housing 59. However, by bodily moving the ring 70 inward and outward parallel to the longitudinal axis of shaft 47 and sleeve 57, inner and outer longitudinal movements of the sleeve 64 occur.

Ring 70 at opposed sides has outwardly extending ears 70a. Rods 72 at their front end portions pass through said ears, receiving thumb nuts and, extending to the rear, pass slidably through the vertical supports 44 and 45. Back of the front support 44 an inverted generally semi-circular yoke 73 (Fig. 12) is located over the tubular shaft 47 and through the opposed sides of which rods 72 pass. The yoke is connected with such rods.

A horizontal shaft 74 is mounted for rocking movement at its ends on the opposed sides 2 of the housing. Generally vertical rods 75 connected with shaft 74 extend upwardly through the yoke 73. An arm or bar 76 at its front end is fixed to the shaft 74 (Figs. 2 and 12) and extends rearwardly therefrom. It has a pivotal connection at its rear end to a second bar 77 at the rear end thereof. The bar 77 at its front end is pivotally connected to a lever 78 below the shaft 74 (Fig. 2). Lever 78 at its rear end is pivotally mounted on the rear vertical support 45. It extends at its front end through the partition 8 and is twisted through an arc of 90 degrees to provide a generally flat front end portion 79. A link 80 at its upper end is pivotally connected to the lever 78 a distance forward of the rear end of said lever. Such link at its lower end is pivotally connected to the armature 81 which enters the solenoid 83.

When the solenoid is energized, armature 81 and link 80 being pulled downwardly, the various bars 76, 77 and 78 are moved to substantially the position shown in dashed lines in Fig. 2 with a consequent counter-clockwise movement of rods 75 to the rear, thereby moving the yoke 73 rearwardly and bodily moving ring 70 and the parts attached thereto from normal position in Fig. 3 to the position shown in Fig. 5.

Manual means is provided for actuating the lever 78 in a downward direction to accomplish the same inward or rearward movement of the sleeve 64 and knives 65. A rock shaft 82 extends between the sides of the housing, having an arm 83 secured thereto which extends downwardly and to the rear to bear against the front end portion 79 of lever 78 (Figs. 1 and 2). A hand operated lever 84 is connected with the rock shaft 82, extending upwardly and forwardly, for accessibility at the front end to one side of the housing of the machine, (Fig. 13). By swinging lever 84 from its full line position in Fig. 2 to the dashed line position, lever 78 is moved downwardly about its pivotal mounting the same at it is pulled downwardly by solenoid 31.

When the deboning machine is to be operated, switch 42 is first closed and remains closed during one or more or a succession of removals of bones from the meat, as in hams or similar meat products. The motor 40 continuously running rotates the hollow shaft 47 continuously. The outer end portions of the cutting knives extend through the opening 16 in the front 15 of the carriage described when such housing is at its outermost position as in Fig. 2. The rounded, enlarged end of the bone at the end of the ham will come against the outturned pointed end portion 68 of such knives, the knives being closed as in Fig. 2.

The second step is to close switch 30 which may be done by a momentary pressure followed by release, thereby completing the circuit (Fig. 14) which drives the motor 22. Such circuit has been broken by the projection 27 on the disk 10 forcing switch 26 to open position. The momentary completion of the circuit by closing switch 30 and then releasing it serves to move the disk 10 and release switch 26 which stays in circuit closing position until the disk 10 has made one revolution.

The one revolution of the disk 10 which is driven by motor 22 moves the ham which rests upon the bottom 12 of the ham carriage from its outermost to innermost position and back again to initial outer position.

Immediately upon the carriage starting inwardly, the first switch 34 is momentarily closed followed by its opening and the circuit broken, the switch at 34 riding against the adjacent side 14 of the carriage being held from return to its initial position. During such momentary closure of the switch 34 solenoid 31 is energized, lever 78 moved downwardly from full line to dashed line position in Fig. 2, and the knives attached at the front end of sleeve 64 are moved a short distance to the rear and ride over the outer end of the inner sleeve 57, as in Fig. 5, being spread to pass over the enlarged outer end of the ham bone. Such opening of the knives is followed by a substantially immediate return thereof to operative cutting position as in Fig. 3, the knives riding against and around the bone until the housing reaches the second switch at 39. The same momentary switch closure follows with opening of the knives as in Fig. 5, followed by their closure on the bone. This action occurs substantially at the time that the interior knuckle or joint between the two bones, the thigh bone and leg bone in a ham is reached and passed over.

When the disk at 10 has completed one-half of its revolution the bone is wholly cut and severed from the meat. On the second half of the revolution the bone is retained in the sleeve 57 and eventually drops from the outer end of shaft 47 as succeeding bones are cut from the meat and push those first severed to the rear.

The handle 84 may be operated at any time it is desirable to open the outer ends of the cutting knives in case that an obstruction should be encountered to be passed over or upon a gouging of the knives into the surface of the bone. The knives are held open as long as lever 84 is manually held in its rear position. The rocking of shaft 74 occurs automatically on the momentary closure of either switch 34 or 39, and also by manual operation of handle 84. When the outer ends of the knives are opened, as in Fig. 5, springs 63 are compressed. Such springs and also the force generated in the knives when they are opened returns the parts to normal operation as in Fig. 3 when free to do so.

The construction described very satisfactorily and efficiently accomplishes rapid severing of bones from hams or the like. The switch at 42 is necessarily first closed so that the cutting knives may be rotated for any meat cutting operation of the machine to take place.

The invention is defined in the appended claims and is to be considered comprehensive of all forms of structure coming within their scope.

I claim:

1. A mechanism as described, an elongated tubular shaft, a tubular member into which the outer portion of said shaft is telescopically received, said member being movable lengthwise of said shaft a limited distance, means connecting said shaft and member, means for rotatably driving said shaft, a plurality of cutting knives secured to the outer end portion of said member and movable therewith, said knives being located around the outer end of said shaft side by side and having free end portions with cutting side edges converging beyond the outer end of said shaft, yielding means acting on said tubular member to normally move it and said knives to outer position, and means for moving said member against said yielding means, whereby the outer end of said shaft engages the inwardly curved outer end portions of said knives and separates them from each other at their free ends.

2. In a machine as described, an elongated tubular shaft, a tubular member around the outer end portion of said shaft connected to rotate therewith and having a limited lengthwise movement thereon, spring means acting on said tubular member normally moving it to outer position, means for moving said tubular member against said spring means in the opposite direction, means for driving said shaft, a plurality of cutting knives positioned side by side around the outer end of said shaft having inwardly curved outer end portions beyond the outer end of the shaft, and means securing said knives to said tubular member at the outer end portion thereof to move therewith.

3. Boning apparatus comprising, a rotatably mounted, elongated tubular shaft, a tubular member around the outer end portion of said shaft movable lengthwise thereof a limited distance, means connecting said shaft and members for simultaneous rotation, spring means normally moving said tubular member outwardly, means for moving said member in the opposite direction against said spring means, a plurality of cutting knives secured at inner end portions to the outer end portion of said tubular member, having narrowed outer end portions normally curving inwardly toward each other beyond the outer end of said shaft, and separated from each other on inward movement of said tubular member, the free outer ends of said knives having terminal portions curving outwardly.

4. Structure as defined in claim 3, said knives back of the front ends thereof, having each a cutting edge for separating meat from a longitudinally located bone in said meat, and means for continuously driving said shaft to move said knives in a circular path around said bone from which meat is cut, said knives being of yielding spring material adapted at the cutting edges thereof to closely follow the surface of a bone about which rotatively moved.

5. Structure as described comprising a horizontally supported, rotatably mounted elongated tubular shaft, means for rotatably driving said shaft, a plurality of cutting knives having shank portions around the outer end portion of said shaft, and free inwardly curved, narrowed end portions extending beyond the outer end of said shaft, means for mounting said knives for a limited longitudinal movement thereof lengthwise of said shaft, means for connecting said knives with said shaft to rotate therewith, means for moving said knives inwardly, and yielding means resisting said movement, and acting to return the knives to initial position when free to do so.

6. A boning machine comprising a rotatably mounted and supported, elongated, horizontal tubular shaft, spring cutting knives around the outer end of said shaft connected to rotate therewith and having outer end portions extending beyond the outer end of said shaft, said end portions being narrowed in width and curved inwardly toward each other adapted to rotate around a generally horizontally located bone lengthwise of and within a ham, and cut the meat from the bone, a carriage movably mounted in front of the outer end of said shaft for movements inwardly and outwardly, means for continuously driving said shaft and means for moving said carriage from outermost to innermost positions and to return said carriage to outermost position, said last mentioned means having automatically actuated means for stopping said carriage in outermost position upon reaching said position.

7. A boning machine comprising, a rotatably mounted and supported, elongated, horizontal tubular shaft, yielding cutting means connected with said shaft to rotate therewith at the outer end portion of said shaft having cutting elements extending beyond the outer end of the shaft and extending inwardly toward each other beyond the adjacent end of said shaft, means for continuously driving said shaft, a horizontal carriage mounted for inward and outward slidable reciprocatory movements located below and generally at the outer end of said shaft, an electric motor, a rotatably mounted disk, a link between the disk and carriage connecting the same, an electric circuit in which the motor is interposed, a switch in said circuit moved to open position by said disk when the carriage is at outer position and closed at all other positions of said disk, a second manually operated switch in said circuit for momentarily closing the circuit when said carriage is at outer position, and means for turning said disk driven by said motor.

8. A boning machine comprising, a rotatably mounted and supported, elongated, tubular shaft, yielding cutting means connected with said shaft to rotate therewith at the outer end of the shaft, means for continuously driving said shaft, a carriage located generally at the outer end of said shaft mounted for inward and outer reciprocating movements, driven means connected with the carriage for reciprocating said carriage inward and outward, means for starting said driven means when the carriage is at outer position and means for automatically stopping said driven means when said carriage is returned to its outer position.

9. In a boning machine, a rotatably mounted and supported, elongated, tubular shaft, yielding cutting means connected with said shaft to rotate therewith generally at the outer end of said shaft, said cutting means being normally closed to rotate around and in close proximity to the surface of a bone to cut meat therefrom, said cutting means having means for opening, spring means yieldingly resisting said opening of said cutting means, means for continuously rotatably driving said shaft, a carriage slidably mounted for inward and outward reciprocating movements adjacent and below the outer end of said shaft, means for moving said carriage from outer to inner positions and stopping the carriage at outer position on return thereto, and means rendered operative by said carriage at a preselected point in the inward movement thereof for momentarily opening said cutting means.

10. Structure having the elements in combination defined in claim 9, and manually operable means for opening said cutting means at any selected position of said carriage.

References Cited in the file of this patent
UNITED STATES PATENTS

| 1,435,877 | Reubold | Nov. 14, 1922 |

FOREIGN PATENTS

| 116,950 | Great Britain | July 4, 1918 |
| 754,501 | France | Aug. 28, 1933 |